(12) United States Patent
Ma et al.

(10) Patent No.: US 8,484,803 B2
(45) Date of Patent: Jul. 16, 2013

(54) ROTATIONAL HINGE

(75) Inventors: Yawei Ma, San Diego, CA (US); Ichiro Yamada, Del Mar, CA (US); Mi Zhou, San Jose, CA (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 251 days.

(21) Appl. No.: 12/868,785

(22) Filed: Aug. 26, 2010

(65) Prior Publication Data

US 2012/0047685 A1 Mar. 1, 2012

(51) Int. Cl.
*E05D 3/06* (2006.01)
(52) U.S. Cl.
USPC .............................................. 16/366; 16/371
(58) Field of Classification Search
USPC .................................................... 16/366, 371
See application file for complete search history.

(56) References Cited

U.S. PATENT DOCUMENTS

| | | | | |
|---|---|---|---|---|
| 1,689,664 A * | 10/1928 | Covell | | 16/371 |
| 7,832,056 B2 * | 11/2010 | Kuwajima et al. | | 16/354 |
| 7,930,803 B2 * | 4/2011 | Ueyama et al. | | 16/366 |
| 2008/0109995 A1 * | 5/2008 | Kuwajima et al. | | 16/354 |
| 2010/0071155 A1 * | 3/2010 | Ueyama et al. | | 16/250 |
| 2011/0265288 A1 * | 11/2011 | Chiang | | 16/341 |

\* cited by examiner

*Primary Examiner* — Victor Batson
*Assistant Examiner* — Matthew Sullivan
(74) *Attorney, Agent, or Firm* — Snyder, Clark, Lesch & Chung, LLP (57) ABSTRACT

A rotational hinge including a first casing linkage; a second casing linkage; a hinge linkage; and a synchronization linkage, wherein the synchronization linkage is coupled to the first casing linkage and the second casing linkage to synchronize a fixed rotational axis and a moving rotational axis that provides one or more degrees of rotation.

20 Claims, 5 Drawing Sheets

ROTATIONAL HINGE

BACKGROUND

With the development of user devices, users may access and exchange information anywhere and anytime. Typically, these user devices offer users a variety of services and applications. For example, these user devices may provide telephone service, e-mail service, texting service, access to the Internet, etc.

In today's marketplace, developers and manufacturers provide users with a variety of styles or forms for user devices. For example, the user device may take the form of a candy-bar style, a clamshell style, or a slider style. The user device having a clamshell-style allows the user to open the user device less than 180 degrees.

SUMMARY

According to one aspect, a rotational hinge may comprise a first casing linkage; a second casing linkage; a hinge linkage; and a synchronization linkage, wherein the synchronization linkage is coupled to the first casing linkage and the second casing linkage to synchronize a fixed rotational axis and a moving rotational axis that provides one or more degrees of rotation.

Additionally, the rotational hinge may comprise a stabilizer to constrain movement of the rotational hinge when the rotational hinge is in a particular rotational position.

Additionally, the stabilizer may comprise gear teeth and the particular position corresponds to a 180 degrees position.

Additionally, the hinge linkage may rotate 90 degrees to position the rotational hinge to a 180 degrees position.

Additionally, the hinge linkage may rotate 180 degrees to position the rotational hinge to a 360 degrees position.

Additionally, the first casing linkage may be in a fixed position when the rotational hinge moves from a 0 degrees position to a 360 degrees position.

Additionally, the first casing linkage and the second casing linkage each include shafts to which the synchronization linkage is coupled.

Additionally, the second casing linkage may rotate about the first casing linkage during rotation of the rotational hinge.

Additionally, the first casing linkage may be configured to couple to a casing of a user device.

Additionally, the second casing linkage may rotate 180 degrees when the rotational hinge moves from a 0 degrees position to a 180 degrees position.

According to another aspect, a user device may comprise a first casing and a second casing; and a rotational hinge. The rotational hinge may comprise a first casing linkage coupled to the first casing; a second casing linkage coupled to the second casing; a synchronization linkage, wherein the synchronization linkage is coupled to the first casing linkage and the second casing linkage to synchronize a fixed rotational axis and a moving rotational axis that provides one or more degrees of rotation; and a hinge linkage to support the first casing, the second casing, and the synchronization linkage.

Additionally, the user device includes at least one of a wireless telephone, a voice recognition application, a video application, a multi-media application, a music player application, an e-mail application, a contacts application, a calendar application, an instant messaging application, a web browsing application, a location-based application.

Additionally, the first casing includes at least one of a display or a key.

Additionally, the hinge linkage may include an "H" configuration.

Additionally, when the rotational hinge may be in a 180 degrees position, the first casing linkage, the second casing linkage, the synchronization linkage, and the hinge linkage may be positioned on a same plane.

Additionally, the user device may comprise a processing system and a memory.

Additionally, the hinge linkage may rotate 180 degrees to position the rotational hinge to a 360 degrees position.

Additionally, the hinge linkage may rotate 90 degrees to position the rotational hinge to a 180 degrees position.

Additionally, the first casing linkage and the second casing linkage may each include shafts to which the synchronization linkage is coupled.

Additionally, a distance between an axis point of one of the shafts associated with the first casing linkage to a coupling point of the synchronization linkage to the first casing linkage may be different from a distance between an axis point of one of the shafts associated with the second casing linkage to a coupling point of the synchronization linkage to the second casing linkage.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the detailed description does not limit the invention. Rather the scope of the invention is defined by the appended claims.

According to exemplary embodiments, a rotational hinge may use a four-bar linkage design having dual axes. According to an exemplary embodiment, one of the axes may be fixed and the other axis may move (i.e., rotate). According to an exemplary embodiment, the rotational hinge may include a synchronization hinge. The synchronization linkage may provide synchronicity between the dual axes. According to an exemplary embodiment, the rotational hinge may provide up to 360 degrees of rotation. Additionally, according to an exemplary embodiment, the rotational hinge may include a stabilizer mechanism to constrain movement at particular positions. By way of example, according to an exemplary embodiment, the stabilizer mechanism may constrain movement of the rotational hinge when in a 180 degrees position of rotation.

According to an exemplary embodiment, a user device may include the rotational hinge to rotate one or more casings of the user device. For example, the user device may have a clamshell style. The rotational hinge may allow a user to connect a flip-open rotation with a self-rotation to adjust the positions of the casing(s).

Figure 1A:
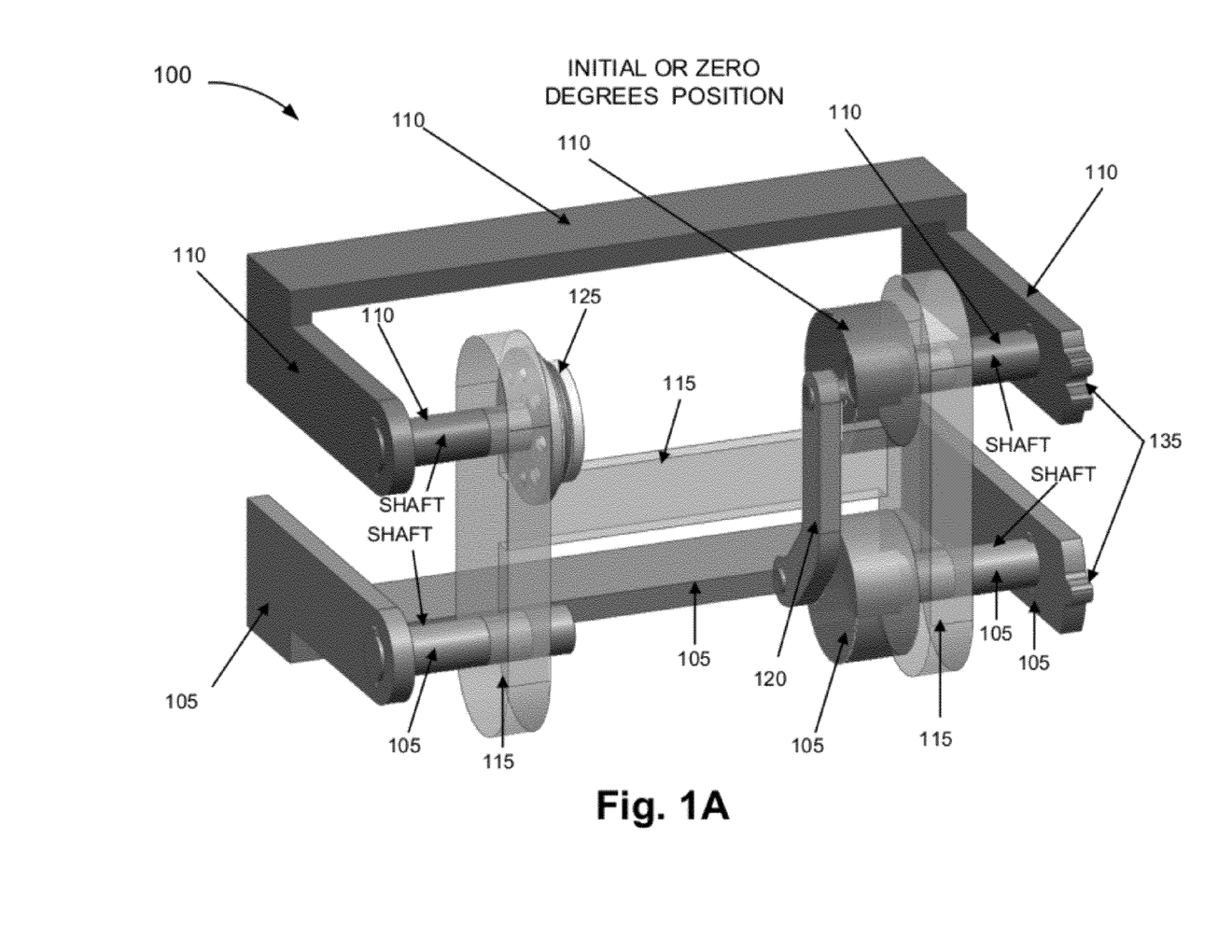
FIG. 1A is a diagram illustrating an exemplary embodiment of a rotational hinge having dual axes and a synchronization linkage in a zero degrees position.

FIG. 1A is a diagram illustrating an exemplary embodiment of a rotational hinge 100 having dual axes and a synchronization linkage in a zero degrees position. Rotational hinge 100 may provide, for example, up to 360 degrees of rotation. As illustrated, rotational hinge 100 may include a first casing linkage 105, a second casing linkage 110, a hinge linkage 115, a synchronization linkage 120, a resilient member 125, and a stabilizer mechanism 135. First casing linkage 105, second casing linkage 110, hinge linkage 115, synchronization linkage 120, and stabilizer mechanism 135 may be made of various materials, such as, for example, plastic, metal, etc. According to other embodiments, rotational hinge 100 may not include resilient member 125.

First casing linkage 105 may support a first casing (not illustrated) associated with a device (not illustrated). For example, the first casing may be coupled to first casing linkage 105. As illustrated in FIG. 1A, according to an exemplary embodiment, portions of first casing linkage 105 may have a symmetrical configuration. According to an exemplary embodiment, first casing linkage 105 may include shaft portions that extend through openings associated with hinge linkage 115. The shaft portions of first casing linkage 105 may be aligned in a same axis and extend toward each other. According to an exemplary embodiment, at one end of one of the shafts there may be a coupling with synchronization linkage 120.

Second casing linkage 110 may support a second casing (not illustrated) associated with a device (not illustrated). For example, the second casing may be coupled to second casing linkage 110. As described further below, a user may rotate the second casing/second casing linkage 110. As illustrated in FIG. 1A, according to an exemplary embodiment, portions of second casing linkage 110 may have a symmetrical configuration. According to an exemplary embodiment, second casing linkage 110 may include shaft portions that extend through openings of hinge linkage 115. The shaft portions of second casing linkage 110 may be aligned in a same axis and extend toward each other. According to an exemplary embodiment, at one end of one of the shafts there may be a coupling with synchronization linkage 120. Additionally, at one end of the other shaft there may be a coupling with resilient member 125. According to other embodiments, resilient member 125 may be coupled with a shaft associated with first casing linkage 105.

Hinge linkage 115 may create a separation between first casing linkage 105 and second casing linkage 110. Hinge linkage 115 may support first casing linkage 105, second casing linkage 110, and synchronization linkage 120. As illustrated in FIG. 1A, according to an exemplary embodiment, hinge linkage 115 may have a symmetrical configuration. According to the exemplary embodiment illustrated, hinge linkage 115 may have an "H" configuration. According to other embodiments, hinge linkage 115 may have a configuration different from an "H" configuration. As illustrated in FIG. 1A, the shafts associated with first casing linkage 105 and the shafts associated with second casing linkage 110 may extend through openings of hinge linkage 115. As described further below, the rotation of hinge linkage 115 does not have a linear relationship with respect to the rotation of second casing linkage 110.

Figure 1B:
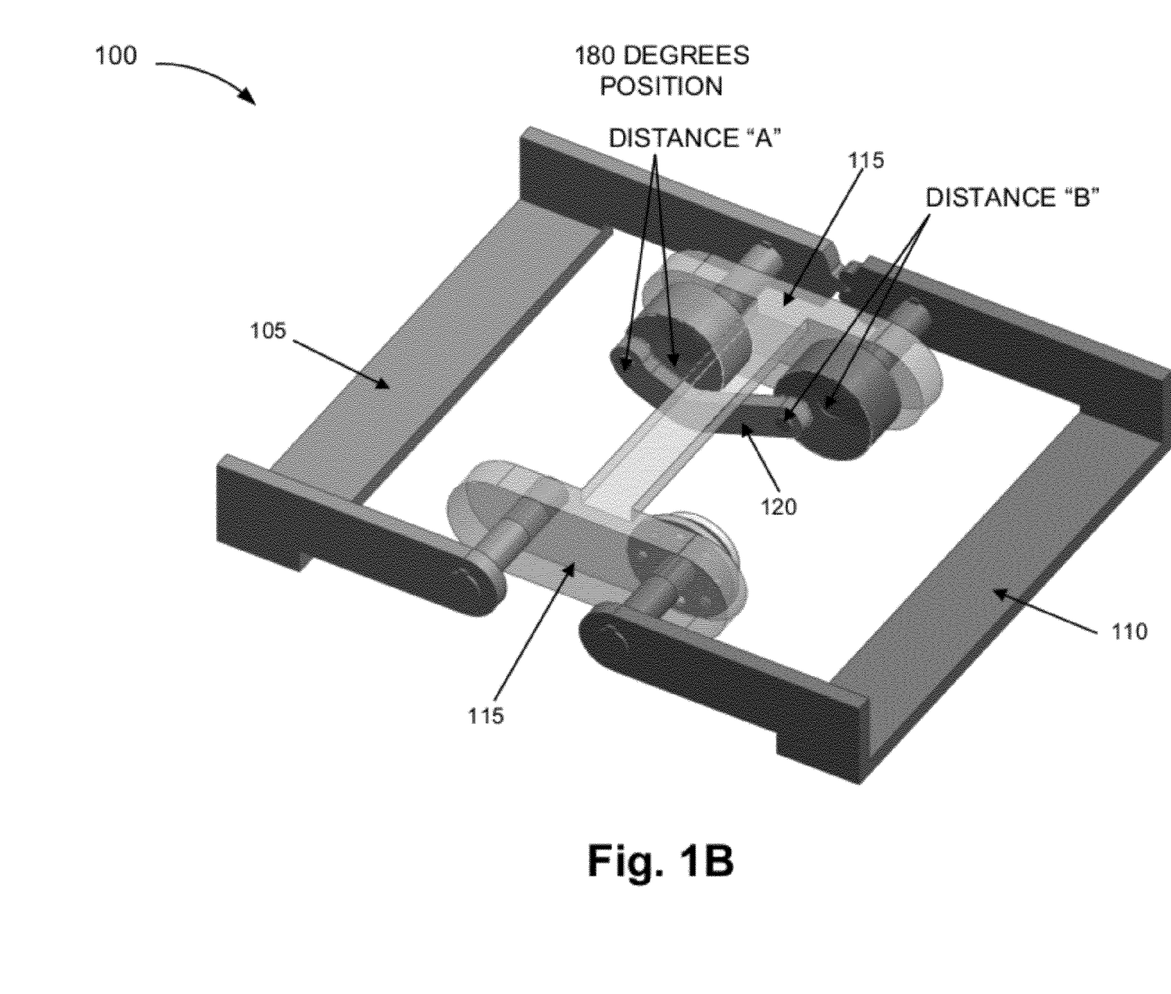
FIG. 1B is a diagram illustrating an exemplary embodiment of a rotational hinge having dual axes and a synchronization linkage in a 180 degrees position.

Synchronization linkage 120 may synchronize the rotation of second casing linkage 110 with respect to first casing linkage 105, which remains stationary during the rotation. Synchronization linkage 120 may also allow hinge linkage 115 to rotate during the rotation. According to an exemplary embodiment, synchronization linkage 120 may have a non-linear configuration. For example, synchronization linkage 120 may have a configuration that includes one or more bends. According to an exemplary embodiment, a distance between a point of coupling of synchronization linkage 120 and a center point (e.g., an axis point) associated with the shaft of first casing linkage 105 may be more than and/or different from a distance between a coupling of synchronization linkage 120 and a center point (e.g., an axis point) associated with the shaft of second casing linkage 110 (as illustrated in FIG. 1B as distance "A" and distance "B").

Referring back to FIG. 1A, resilient member 125 may create preset rotational stop(s) or preset rotational position(s). According to an exemplary embodiment, resilient member 125 may include a detent spring. Additionally, wave washers may be used to create frictional rotational stop(s). According to other embodiments, resilient member 125 may include a different type of spring or some other type of resilient member. As illustrated in FIG. 1A, according to an exemplary embodiment, resilient member 125 may be coupled to second casing linkage 110. According to other embodiments, resilient member 125 may be coupled to first casing linkage 105.

Stabilizer mechanism 135 may constrain movement at particular rotational position(s). According to an exemplary embodiment, stabilizer mechanism 135 may include gear teeth that when locked at a particular position provides the above-mentioned constraint. According to other exemplary embodiments, stabilizer mechanism 135 may include other types of mechanisms to provide this function.

According to an exemplary embodiment, during the course of rotation from a zero degrees position to a non-zero degrees position, first casing linkage 105 may remain in the same position (e.g., stationary) and second casing linkage 110, hinge linkage 115, and synchronization linkage 120 may rotate. For example, FIG. 1B is a diagram illustrating an exemplary embodiment of rotational hinge 100 having dual axes and synchronization linkage 120 in a 180 degrees position. As illustrated the four linkages (i.e., first casing linkage 105, second casing linkage 110, hinge linkage 115, and synchronization 120) may rotate to positions that are substantially horizontal (e.g., positioned on a same plane). As further illustrated, the shafts associated with first casing linkage 105, as well as other portions of first casing linkage 105 may remain stationary. Second casing linkage 110 may rotate 180 degrees and the shafts associated with second casing linkage 110 may be in the same position relative to when second casing linkage 110 is in a zero degrees position.

As further illustrated in FIG. 1B, hinge linkage 115 may rotate. However, the rotation of hinge linkage 115 may not correspond to a one-to-one relationship with the rotation of second casing linkage 110. For example, when second casing linkage 110 rotates 180 degrees, hinge linkage 115 may rotate 90 degrees.

According to an exemplary embodiment, stabilizer mechanism 135 may be engaged at the 180 degrees position so that first casing linkage 105 and second casing linkage 110 to constrain movement. According to other embodiments, stabilizer mechanism 135 may be engaged to provide constraint with respect to other rotational positions.

Figure 1C:
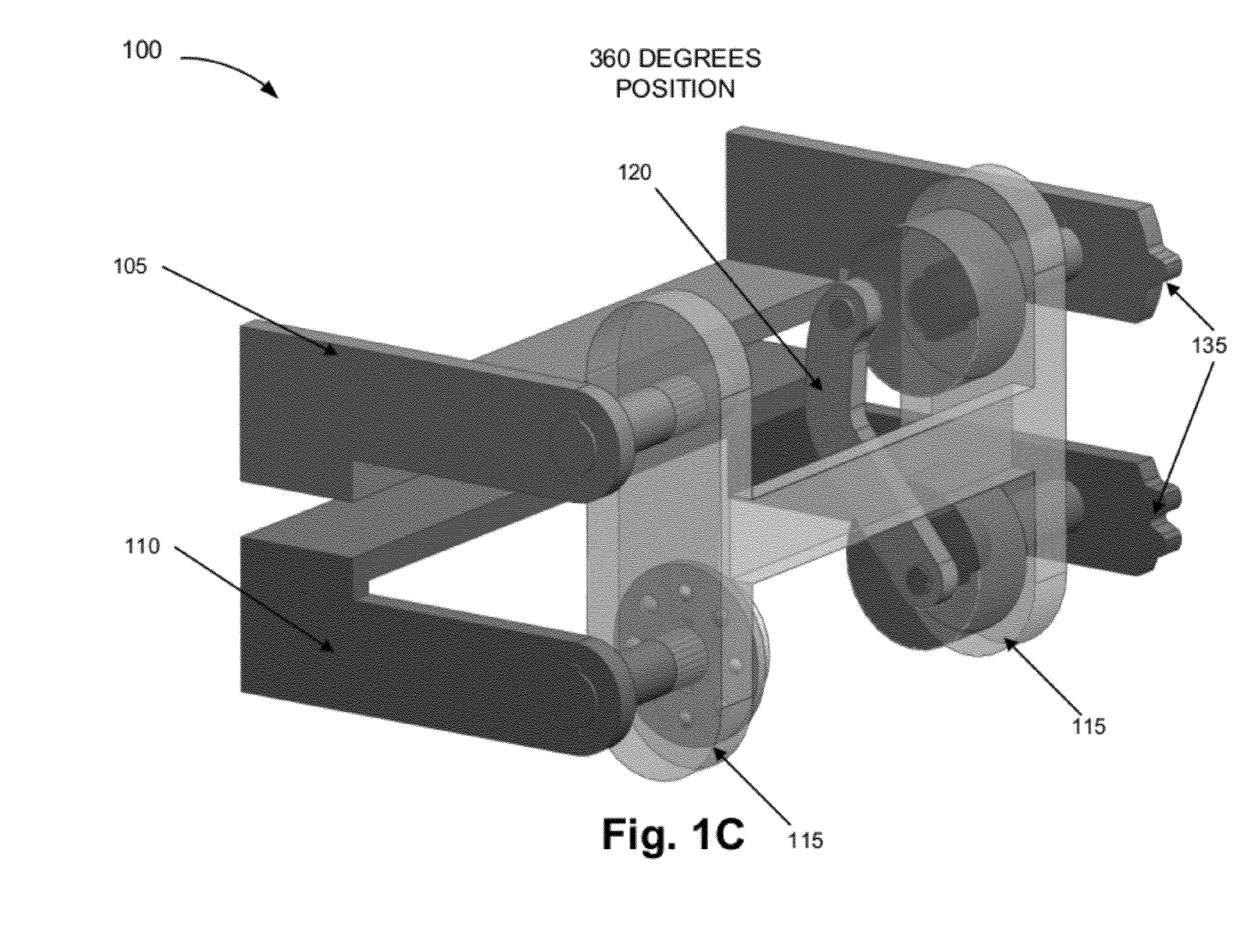
FIG. 1C is a diagram illustrating an exemplary embodiment of a rotational hinge having dual axes and a synchronization linkage in a 360 degrees position.

FIG. 1C is a diagram illustrating an exemplary embodiment of rotational hinge 100 having dual axes and synchronization linkage 120 in a 360 degrees position. As illustrated, the shafts associated with first casing linkage 105, as well as other portions of first casing linkage 105 may remain stationary. Second casing linkage 110 may rotate 360 degrees and the shafts associated with second casing linkage 110 may be in the same position relative to when second casing linkage 110 is in a zero degrees position. Second casing linkage 110 may be positioned beneath first casing linkage 105.

As further illustrated in FIG. 1C, hinge linkage 115 may rotate. For example, when second casing linkage 110 rotates 360 degrees, hinge linkage 115 may rotate 180 degrees. Similar to when rotational hinge 100 is in a 0 degrees position, according to an exemplary embodiment, stabilizer mechanism 135 may be disengaged.

According to an exemplary embodiment, rotational hinge 100 may be used as a mechanism to provide up to 360 degrees rotation. For example, rotational hinge 100 may be included with a user device to provide a user with a greater number of interactive positions with the user device. Additionally, rotational hinge 100 may be lighter in weight, less complex in structure, and/or less susceptible to breakage relative to other hinges. For example, rotational hinge 100 may omit gears such that containments may be less likely to impact the operation of rotational hinge 100.

Since an exemplary embodiment of the rotational hinge has been broadly described, a further description is provided below.

Figure 2:
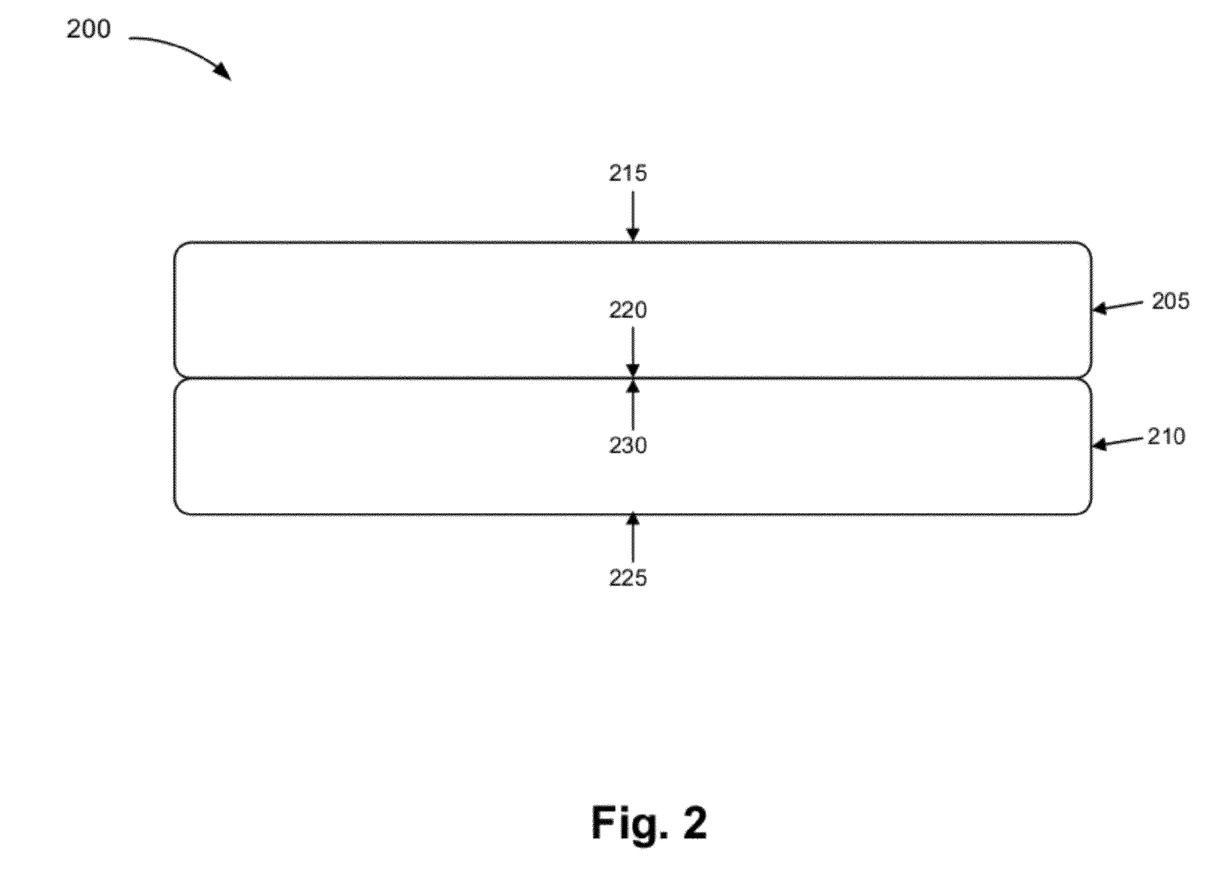
FIG. 2 is a diagram illustrating an exemplary user device in which an exemplary embodiment of the rotational hinge may be implemented.

FIG. 2 is a diagram illustrating an exemplary user device 200 in which an exemplary embodiment of rotational hinge 100 may be implemented. The term "user device," as used herein, is intended to be broadly interpreted to comprise a variety of devices. By way of example, user device 200 may comprise a portable device, a mobile device, a handheld device, or a stationary device. User device 200 may comprise a telephone (e.g., a wireless phone (e.g., a radio phone, etc.), or a wired phone), a data organizer, a computer, a music playing device, a location-aware device, a gaming device, a picture-capturing device, a video-capturing device, a communication device, a Web-access device, and/or some other type of user device.

According to exemplary embodiment, user device 200 may correspond to a clamshell-style user device. According to other exemplary embodiments, user device 200 may correspond to a different style of device or combination thereof. As illustrated, user device 200 may include a first casing 205 and a second casing 210. First casing 205 may include a top surface 215 and an inner surface 220. Second casing 210 may include an outer surface 225 and an inner surface 230.

User device 200 may include various components, such as, for example, a display, keys, a microphone, speakers, and/or other types of input and/or output mechanisms that may be encased by first casing 205 and/or second casing 210.

Figure 3:
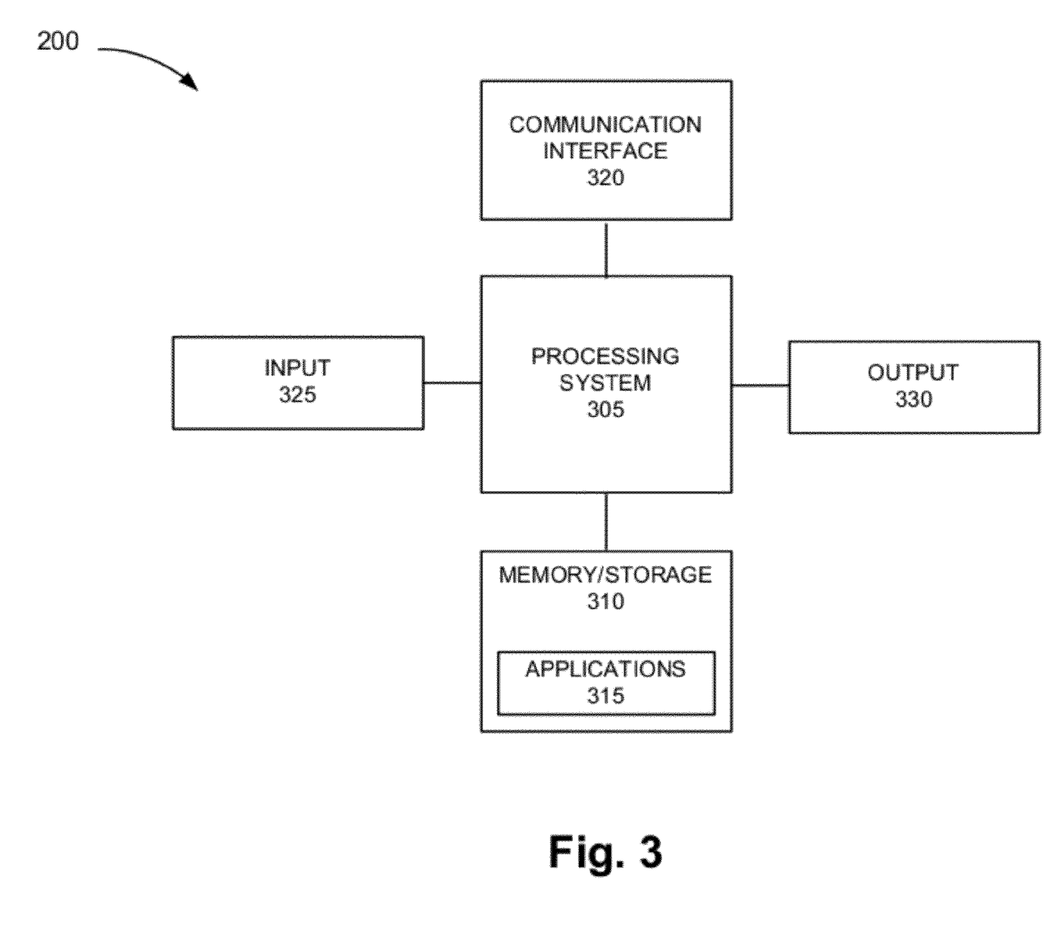
FIG. 3 is a diagram illustrating exemplary components of the user device.

FIG. 3 is a diagram illustrating exemplary components of user device 200. As illustrated, user device 200 may comprise a processing system 305, a memory/storage 310 that may comprise applications 315, a communication interface 320, an input 325, and an output 330. According to other embodiments, user device 200 may comprise fewer components, additional components, different components, or a different arrangement of components than those illustrated in FIG. 3 and described herein.

Processing system 305 may comprise one or multiple processors, microprocessors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 305 may control the overall operation or a portion of operation(s) performed by user device 200. Processing system 305 may perform one or more operations based on an operating system and/or various applications (e.g., applications 315). Processing system 305 may access instructions from memory/storage 310, from other components of user device 200, and/or from a source external to user device 200 (e.g., a network or another device).

Memory/storage 310 may comprise one or multiple memories and/or one or multiple secondary storages. For example, memory/storage 310 may comprise a random access memory (RAM), a dynamic random access memory (DRAM), a read only memory (ROM), a programmable read only memory (PROM), a flash memory, and/or some other type of memory. Memory/storage 310 may comprise a hard disk (e.g., a magnetic disk, an optical disk, a magneto-optic disk, a solid state disk, etc.) or some other type of computer-readable medium, along with a corresponding drive. Memory/storage 310 may also comprise a memory, a storage device, or storage medium that is external to and/or removable from user device 200, such as, for example, a Universal Serial Bus (USB) memory, a dongle, a hard disk, mass storage, off-line storage, etc. Memory/storage 310 may store data, application(s), and/or instructions related to the operation of user device 200.

Applications 315 may comprise software that provides various services or functions. By way of example, applications 315 may comprise a telephone application, a voice recognition application, a video application, a multi-media application, a music player application, an e-mail application, a contacts application, a calendar application, an instant messaging application, a web browsing application, a location-based application (e.g., a Global Positioning System (GPS)-based application, etc.), and/or other types of applications (e.g., a facial expression/recognition application, etc.).

Communication interface 320 may permit user device 200 to communicate with other devices, networks, and/or systems. For example, communication interface 320 may comprise one or multiple wireless and/or wired communication interfaces. Communication interface 320 may comprise a transmitter, a receiver, and/or a transceiver. Communication interface 320 may operate according to various protocols, communication standards, or the like.

Input 325 may permit an input into user device 200. For example, input 325 may comprise a microphone, keys, a display, a touchpad, a button, a switch, a camera, an input port, voice recognition logic, fingerprint recognition logic, a web cam, and/or some other type of visual, auditory, tactile, etc., input component. Output 330 may permit user device 200 to provide an output. For example, output 330 may comprise speakers, a display, one or more light emitting diodes (LEDs), an output port, a vibratory mechanism, and/or some other type of output component.

The foregoing description of implementations provides illustration, but is not intended to be exhaustive or to limit the implementations to the precise form disclosed. Modifications and variations are possible in light of the above teachings or may be acquired from practice of the teachings.

The terms "comprise," "comprises," "comprising," as well as synonyms thereof (e.g., include, etc.), when used in the specification is taken to specify the presence of stated features, integers, steps, or components but does not preclude the presence or addition of one or more other features, integers, steps, components, or groups thereof. In other words, these terms mean inclusion without limitation.

Spatially relative terms, such as, for example, "top," "bottom," "beneath," "upward," "up," "downward," "above," and the like, may be used for ease of description to describe one element's relationship to another element or to describe one feature's relationship to another feature, as may be illustrated in the figures and/or described. Spatially relative terms are intended to encompass different orientations of the rotational hinge in use or operation, in addition to the use or the operation illustrated in the figures and/or described. For example, if the rotational hinge illustrated in a figure is turned over or oriented differently than an orientation illustrated (e.g., rotated at 90 degrees or some other rotation, etc.), the spatially relative terms used herein should be interpreted accordingly. Additionally, use of numerical degrees (e.g., 0 degrees, 180 degrees, etc.) in this description is meant to include degrees approximate to those numerical degrees.

The terms "couple," "couples," "coupled," "coupling," etc., as well as synonyms thereof (e.g., connects, linked, attached, etc.), when used in this description is meant to include a direct connection or an indirect connection between two or more elements.

The article "a," "an," and "the" are intended to mean one or more items. Further, the phrase "based on" is intended to mean "based, at least in part, on" unless explicitly stated otherwise. The term "and/or" is intended to mean any and all combinations of one or more of the listed items.

No element, act, or instruction used in the present application should be construed as critical or essential to the implementations described herein unless explicitly described as such.

What is claimed is:

1. A rotational hinge comprising: a first casing linkage; a second casing linkage; a hinge linkage; and a synchronization linkage that extends in a first direction and a second direction to form a bend, wherein the synchronization linkage is coupled to the first casing linkage and the second casing linkage and synchronizes a fixed rotational axis and a moving rotational axis that provides one or more degrees of rotation, wherein the first casing linkage comprises a first shaft and the second casing linkage comprises a second shaft, each include shafts to which the synchronization linkage is coupled, wherein a distance between a central axis of the first shaft and an axis passing through a first coupling point of the synchronization linkage to the first shaft is different from a distance between a central axis of the second shaft and an axis passing through a second coupling point of the synchronization linkage to the second casing linkage.

2. The rotational hinge of claim 1, wherein the first casing linkage comprises a first stabilizer and the second case linkage comprises a second stabilizer, wherein the first stabilizer and the second stabilizer are engaged when the rotational hinge is in a first position and the first stabilizer and the second stabilizer are not engaged when the rotational hinge is in a second position.

3. The rotational hinge of claim 2, wherein the first position corresponds to a 180 degrees position, and wherein the second position corresponds to 0 degrees position.

4. The rotational hinge of claim 1, wherein the hinge linkage rotates 90 degrees to position the rotational hinge to a 180 degrees position.

5. The rotational hinge of claim 1, wherein the hinge linkage rotates 180 degrees to position the rotational hinge to a 360 degrees position.

6. The rotational hinge of claim 1, wherein the first casing linkage is in a fixed position when the rotational hinge moves from a 0 degrees position to a 360 degrees position.

7. The rotational hinge of claim 1, wherein the first casing linkage comprises a first shaft and the second casing linkage comprises a second shaft, wherein a distance between an axis point of the first shaft and a first coupling point of the synchronization linkage to the first shaft is different from a distance between an axis point of the second shaft and a second coupling point of the synchronization linkage to the second casing linkage, wherein the axis point of the first shaft, the axis point of the second shaft, the first coupling point, and the second coupling point are on a same imaginary plane.

8. The rotational hinge of claim 1, wherein the second casing linkage rotates about the first casing linkage during rotation of the rotational hinge.

9. The rotational hinge of claim 1, wherein the first casing linkage is configured to couple to a casing of a user device.

10. The rotational hinge of claim 1, wherein the second casing linkage rotates 180 degrees when the rotational hinge moves from a 0 degrees position to a 180 degrees position.

11. A user device comprising:
a first casing and a second casing; and
a rotational hinge comprising:
a first casing linkage coupled to the first casing;
a second casing linkage coupled to the second casing;
a synchronization linkage that extends in a first direction and a second direction to form a bend, wherein the synchronization linkage is coupled to the first casing linkage and the second casing linkage and synchronizes a fixed rotational axis and a moving rotational axis that provides one or more degrees of rotation;
and a hinge linkage to support the first casing, the second casing, and the synchronization linkage;
wherein the first casing linkage comprises a first shaft and the second casing linkage comprises a second shaft, each include shafts to which the synchronization linkage is coupled, wherein a distance between a central axis of the first shaft and an axis passing through a first coupling point of the synchronization linkage to the first shaft is different from a distance between a central axis of the second shaft and an axis passing through a second coupling point of the synchronization linkage to the second casing linkage.

12. The user device of claim 11, wherein the user device includes at least one of a wireless telephone, a voice recognition application, a video application, a multi-media application, a music player application, an e-mail application, a contacts application, a calendar application, an instant messaging application, a web browsing application, a location-based application.

13. The user device of claim 11, wherein the first casing includes at least one of a display or a key.

14. The user device of claim 11, wherein the hinge linkage includes an "H" configuration, and wherein a first portion of the synchronization linkage that extends in the first direction is of a different length than a second portion of the synchronization linkage that extends in the second direction.

15. The user device of claim 11, wherein when the rotational hinge is in a 180 degrees position, the first casing linkage, the second casing linkage, the synchronization linkage, and the hinge linkage are positioned on a same plane.

16. The user device of claim 11, further comprising:
a processing system; and
a memory.

17. The user device of claim 11, wherein the hinge linkage rotates 180 degrees to position the rotational hinge to a 360 degrees position.

18. The user device of claim 11, wherein the hinge linkage rotates 90 degrees to position the rotational hinge to a 180 degrees position.

19. The user device of claim 11, wherein the first casing linkage comprises a first shaft and the second casing linkage comprises a second shaft, wherein the synchronization linkage is coupled to the first shaft and the second shaft.

20. The user device of claim 19, wherein a distance between an axis point of the first shaft and a first coupling point of the synchronization linkage to the first shaft is different from a distance between an axis point of the second shaft and a second coupling point of the synchronization linkage to the second casing linkage, wherein the axis point of the first shaft, the axis point of the second shaft, the first coupling point, and the second coupling point are on a same imaginary plane.

* * * * *